United States Patent
Agarwal et al.

(10) Patent No.: US 10,838,996 B2
(45) Date of Patent: Nov. 17, 2020

(54) DOCUMENT REVISION CHANGE SUMMARIZATION

(71) Applicant: International Business Machines Corporation, Armonk, NY (US)

(72) Inventors: Arvind Agarwal, Gurgaon (IN); Vitobha Munigala, Hyderabad (IN); Riddhiman Dasgupta, Kolkata (IN); Arun Kumar, Noida (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/922,720

(22) Filed: Mar. 15, 2018

(65) Prior Publication Data
US 2019/0286741 A1  Sep. 19, 2019

(51) Int. Cl.
*G06F 40/30* (2020.01)
*G06F 16/34* (2019.01)
(Continued)

(52) U.S. Cl.
CPC .......... *G06F 16/345* (2019.01); *G06F 40/205* (2020.01); *G06F 40/30* (2020.01); *G06K 9/00483* (2013.01)

(58) Field of Classification Search
CPC ............... G06F 17/2785; G06F 16/345; G06F 17/2211; G06F 17/2288; G06F 17/277;
(Continued)

(56) References Cited

U.S. PATENT DOCUMENTS 6,317,708 B1 * 11/2001 Witbrock ............ G06F 17/2715
704/9
6,324,555 B1  11/2001 Sites
(Continued)

FOREIGN PATENT DOCUMENTS

EP  1220120 A3  6/2005

OTHER PUBLICATIONS

Trandabat, "Using Semantic Roles to Improve Summaries", publisher: Aclweb.org, published: 2011, pp. 164-169 (Year: 2011).*
(Continued)

*Primary Examiner* — Wilson W Tsui
(74) *Attorney, Agent, or Firm* — Ference & Associates, LLC

(57) ABSTRACT

One embodiment provides a method, including: obtaining at least two documents, wherein one of the at least two documents comprises a different revision of another of the at least two documents; identifying a structure of each of the at least two documents by parsing each of the at least two documents to extract text from each of the at least two documents; aligning sections of the at least two documents, wherein the aligning comprises matching a section from one of the at least two documents and a corresponding section from another of the at least two documents; identifying at least one difference between the at least two documents; assigning a semantic label to the identified at least one difference; and providing a summary of the identified at least one difference by compressing the text surrounding the identified at least one difference using the assigned semantic label.

20 Claims, 4 Drawing Sheets

(51) Int. Cl.
  *G06K 9/00* (2006.01)
  *G06F 40/205* (2020.01)
(58) Field of Classification Search
  CPC .... G06F 16/3344; G06F 16/367; G06F 16/17;
    G06F 16/271; G06F 16/24578; G06F
    16/285; G06F 16/355; G06F 17/27; G06F
    16/93; G06F 17/21; G06F 17/248; G06F
    17/2745; G06F 17/2765; G06F 17/278;
    G06F 17/2881; G06F 17/271; G06F
    17/17; G06F 40/30; G06F 40/205; G06K
    9/00483
  See application file for complete search history.

(56) References Cited

U.S. PATENT DOCUMENTS

| | | | | |
|---|---|---|---|---|
| 6,963,830 | B1* | 11/2005 | Nakao | G06F 16/345 704/1 |
| 6,981,225 | B1 | 12/2005 | Gaudette | |
| 7,418,661 | B2 | 8/2008 | Brandenberger | |
| 8,196,030 | B1 | 6/2012 | Wang et al. | |
| 8,639,496 | B2* | 1/2014 | Jakubik | G06F 17/28 704/255 |
| 8,965,983 | B2 | 2/2015 | Costenaro et al. | |
| 9,092,428 | B1* | 7/2015 | Zhang | G06F 17/2785 |
| 9,569,406 | B2 | 2/2017 | Shaver | |
| 9,747,259 | B2 | 8/2017 | Kapadia | |
| 2004/0044519 | A1* | 3/2004 | Polanyi | G06F 16/345 704/9 |
| 2005/0060140 | A1* | 3/2005 | Maddox | G06F 16/3344 704/4 |
| 2005/0060643 | A1* | 3/2005 | Glass | G06F 17/241 715/205 |
| 2006/0178868 | A1* | 8/2006 | Billerey-Mosier | G06F 17/2881 704/9 |
| 2007/0150443 | A1* | 6/2007 | Bergholz | G06F 16/258 |
| 2008/0104034 | A1 | 5/2008 | Stewart et al. | |
| 2009/0112892 | A1* | 4/2009 | Cardie | G06F 16/345 |
| 2009/0172558 | A1 | 7/2009 | Pickens et al. | |
| 2009/0327921 | A1 | 12/2009 | Holm-Peterson et al. | |
| 2010/0235165 | A1* | 9/2010 | Todhunter | G06F 16/3329 704/9 |
| 2011/0276322 | A1* | 11/2011 | Sandor | G06F 17/2785 704/9 |
| 2011/0295903 | A1* | 12/2011 | Chen | G06F 16/367 707/794 |
| 2012/0029908 | A1* | 2/2012 | Takamatsu | G06F 16/345 704/9 |
| 2013/0325440 | A1* | 12/2013 | Kim | G06F 17/27 704/9 |
| 2016/0188584 | A1 | 6/2016 | Glover et al. | |
| 2017/0018046 | A1* | 1/2017 | Lee | G06F 40/197 |
| 2017/0048216 | A1 | 2/2017 | Chow et al. | |
| 2018/0285326 | A1* | 10/2018 | Goyal | G06F 17/2211 |

OTHER PUBLICATIONS

Jatowt, Adam et al., "Change Summarization in Web Collections", LNAI, 2004, 10 pages, Springer-Verlag Berlin Heidelberg.

Cortes-Coy, Luis Fernando et al., "On Automatically Generating Commit Messages via Summarization of Source Code Changes", 2014 14th International Working Conference on Source Code Analysis and Manipulation, 2014, 10 pages, IEEE Computer Society.

Nunes, Sergio et al., "Summarization of Changes in Text Collections", PhD Proposal for the MAP-i Program, Dec. 18, 2012, 5 pages, University of Porto.

Mani, Inderjeet et al., "Summarizing Similarities and Differences Among Related Documents", Information Retrieval, 1999, 33 pages, Kluwer Academic Publishers, Boston, Manufactured in The Netherlands.

* cited by examiner

Algorithm 1 Graph Algorithm

```
1:  procedure TREE-STRUCTURE(Doc)
2:      for clause in Doc do
3:          if clause is at level 1 then
4:              begin new node with parent as root
5:          else
6:              append to the previous level node as a child
7:          end if
8:      end for
9:  end procedure
10:
11: procedure GRAPH-ALIGNMENT(Doc1, Doc2)
12:     Tree1 ← TREE-STRUCTURE(Doc1)
13:     Tree2 ← TREE-STRUCTURE(Doc2)
14:     for heading node in Tree1 do
15:         find top 3 heading nodes from Tree2 based on the
            similarity score.
16:     end for
17:
18:     for heading node H in Tree1 do
19:         for clause node in sub-tree of H do
20:             find best matching clause among the clauses
                present in the sub-trees of top 3 heading nodes of H in
                Tree2 using similarity score.
21:         end for
22:     end for
23:
24:     for unaligned clause in Tree1 do
25:         find best matching clause among the unaligned
            clauses in Tree2 using similarity score.
26:     end for
27:
28:     Remaining unaligned clauses in Tree1 are treated as
        deleted clauses
29:     Remaining unaligned clauses in Tree2 are treated as
        newly added clauses
30: end procedure
```

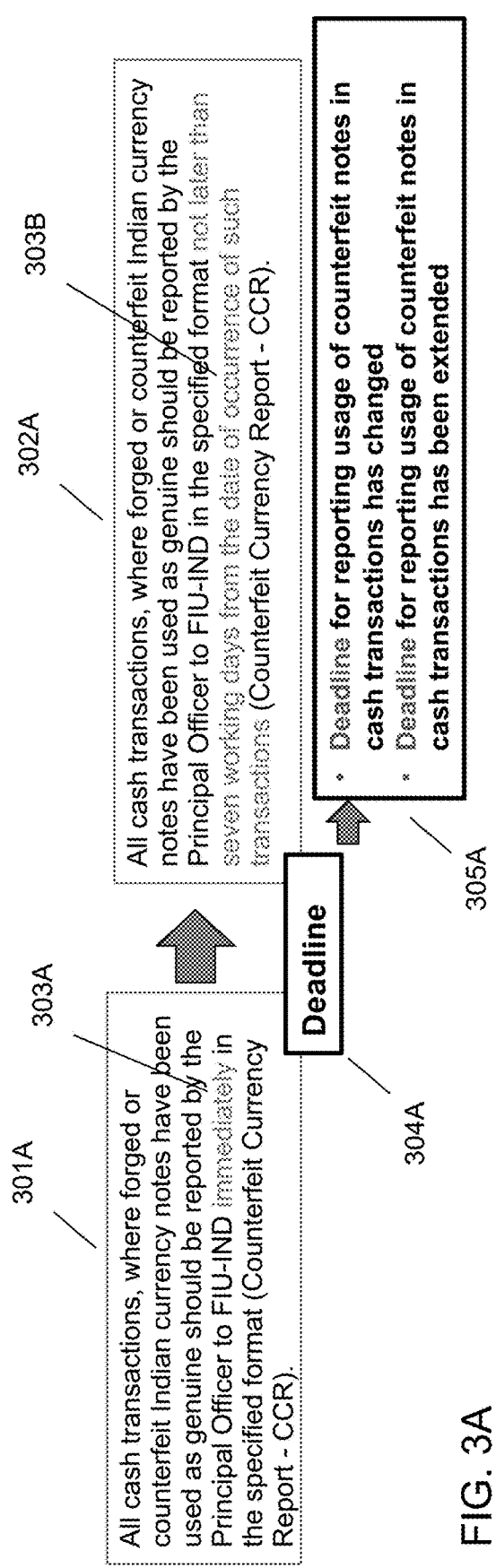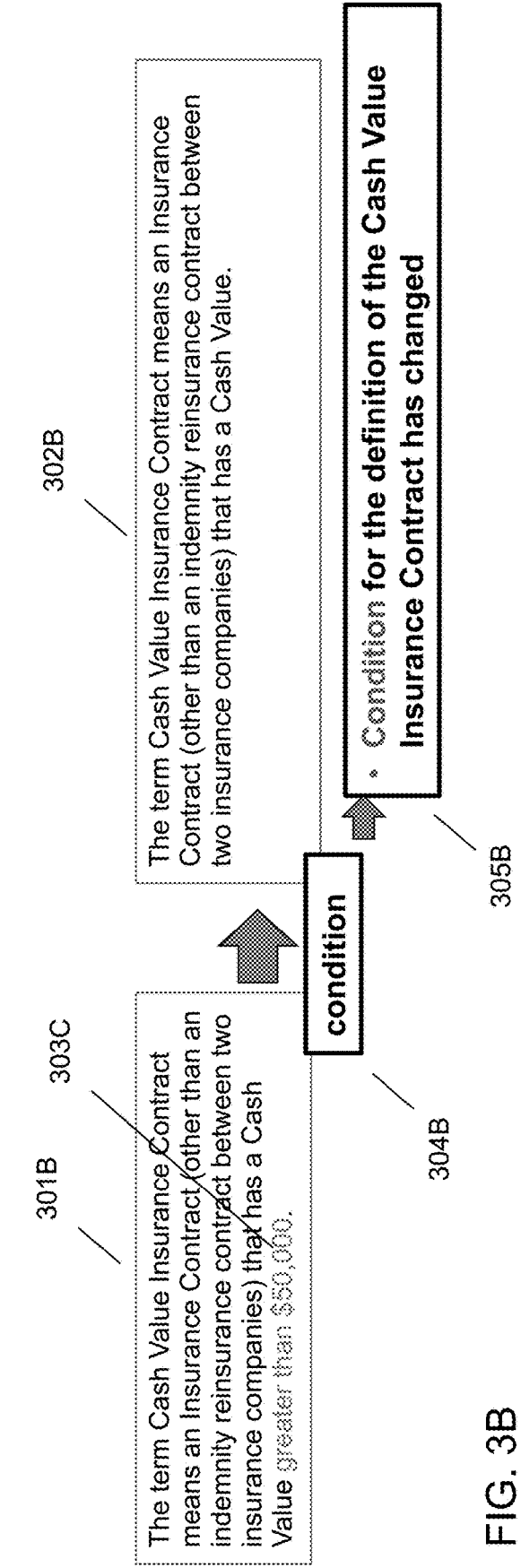
FIG. 3A
FIG. 3B

DOCUMENT REVISION CHANGE SUMMARIZATION

BACKGROUND

Entities may create documents that are used to ensure that all entities within a particular field or sector meet a threshold performance. For example, governmental agencies may create regulation or compliance documents that identify regulations or rules that must be followed by an entity within the appropriate sector. These rules and regulations are created to ensure a desired level of public safety, a desired level of public privacy, a desired level of security, or the like. For example, governmental regulation documents are created for the financial sector, power generation sector, legal sector, construction sector, and the like.

Additionally, rules—and regulations—documents may be created for neighborhood associations, employment associations, municipalities, and the like. In other words, any governing body may create a document that provides the rules and regulations for entities that are within the governing reach of the governing body. The documents provide a mechanism so that entities within the sector are made aware of the rules that have been created by the governing entity. As rules change, for example, in response to new laws or requirements, the documents are revised to reflect the new rules and regulations that are required to be met.

BRIEF SUMMARY

In summary, one aspect of the invention provides a method, comprising: obtaining at least two documents, wherein one of the at least two documents comprises a different revision of another of the at least two documents; identifying a structure of each of the at least two documents by parsing each of the at least two documents to extract text from each of the at least two documents; aligning, based upon the identified structure, sections of the at least two documents, wherein the aligning comprises matching a section from one of the at least two documents and a corresponding section from another of the at least two documents; identifying at least one difference between the at least two documents by comparing the aligned sections of the at least two documents; assigning a semantic label to the identified at least one difference, wherein the semantic label describes a semantic role of a word within text surrounding the identified at least one difference; and providing a summary of the identified at least one difference by compressing the text surrounding the identified at least one difference using the assigned semantic label.

Another aspect of the invention provides an apparatus, comprising: at least one processor; and a computer readable storage medium having computer readable program code embodied therewith and executable by the at least one processor, the computer readable program code comprising: computer readable program code configured to obtain at least two documents, wherein one of the at least two documents comprises a different revision of another of the at least two documents; computer readable program code configured to identify a structure of each of the at least two documents by parsing each of the at least two documents to extract text from each of the at least two documents; computer readable program code configured to align, based upon the identified structure, sections of the at least two documents, wherein the aligning comprises matching a section from one of the at least two documents and a corresponding section from another of the at least two documents; computer readable program code configured to identify at least one difference between the at least two documents by comparing the aligned sections of the at least two documents; computer readable program code configured to assign a semantic label to the identified at least one difference, wherein the semantic label describes a semantic role of a word within text surrounding the identified at least one difference; and computer readable program code configured to provide a summary of the identified at least one difference by compressing the text surrounding the identified at least one difference using the assigned semantic label.

An additional aspect of the invention provides a computer program product, comprising: a computer readable storage medium having computer readable program code embodied therewith, the computer readable program code executable by a processor and comprising: computer readable program code configured to obtain at least two documents, wherein one of the at least two documents comprises a different revision of another of the at least two documents; computer readable program code configured to identify a structure of each of the at least two documents by parsing each of the at least two documents to extract text from each of the at least two documents; computer readable program code configured to align, based upon the identified structure, sections of the at least two documents, wherein the aligning comprises matching a section from one of the at least two documents and a corresponding section from another of the at least two documents; computer readable program code configured to identify at least one difference between the at least two documents by comparing the aligned sections of the at least two documents; computer readable program code configured to assign a semantic label to the identified at least one difference, wherein the semantic label describes a semantic role of a word within text surrounding the identified at least one difference; and computer readable program code configured to provide a summary of the identified at least one difference by compressing the text surrounding the identified at least one difference using the assigned semantic label.

A further aspect of the invention provides a method, comprising: obtaining two documents, wherein each of the two documents comprises a different version of the same document; identifying word changes between the two documents by (i) matching sections from the two documents and (ii) comparing the matched sections between the two documents; assigning a semantic label to each of the identified word changes, wherein the semantic label identifies a semantic role of the changed word within the surrounding sentence structure of the document; generating, using the assigned semantic labels, a natural language summary for each of the identified word changes that summarizes what has changed between the different versions of the same document; and providing the natural language summary.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 illustrates an example document alignment and difference identification algorithm.

FIG. 3A-3B illustrate example outputs from difference identification and summarization.

DETAILED DESCRIPTION

Figure 1:
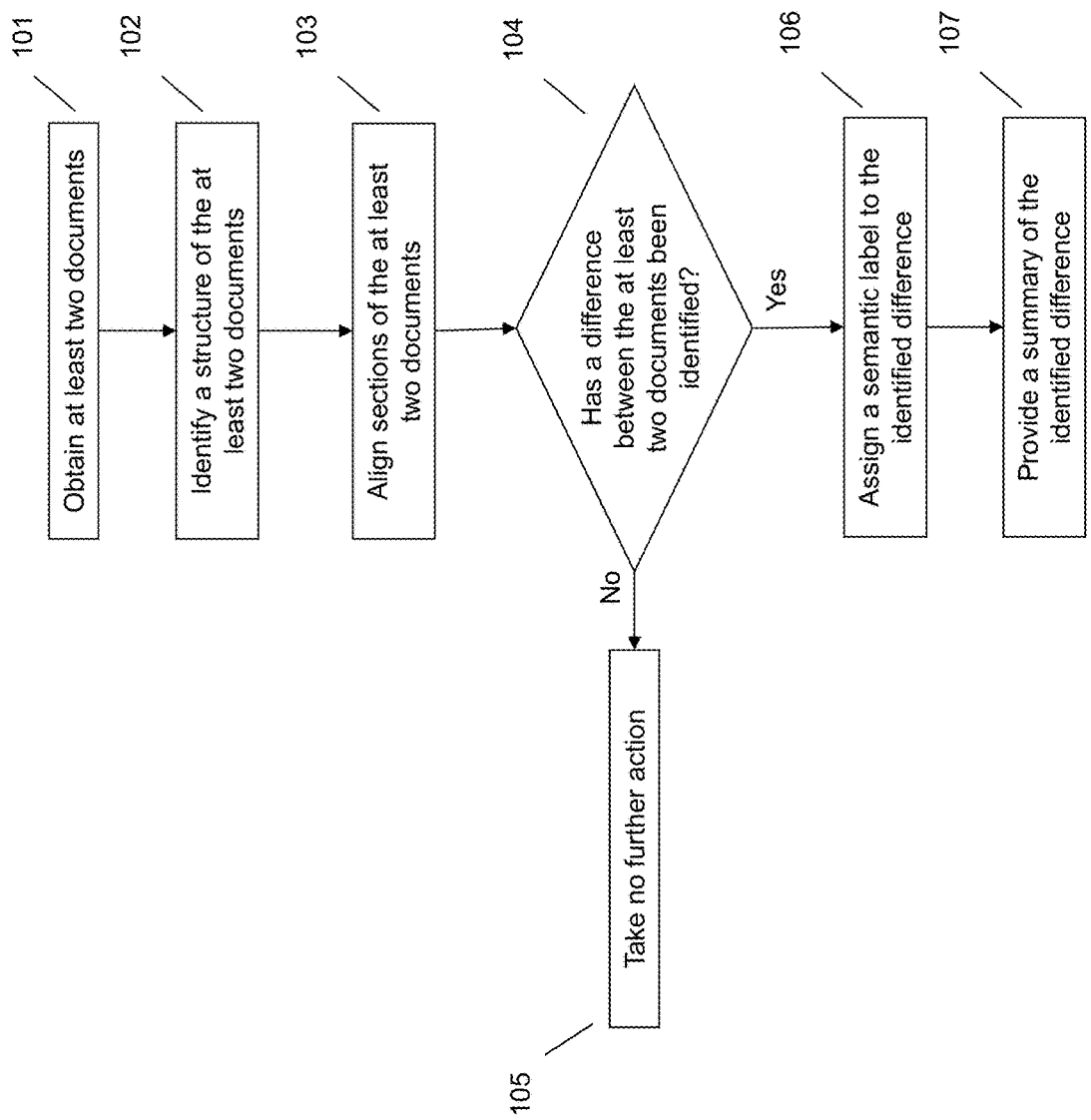
FIG. 1 illustrates a method of providing a summary of changes between revisions of a document.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Many documents that encompass the rules and regulations of a governing body may be very extensive, for example, the document may contain thousands of pages. Additionally, these documents may be very technical since they are directed to a particular sector, thereby making them difficult to read and digest for a person outside of that sector. Thus, many sectors that are subject to rules and regulations of a governing body have a person or department that is responsible for ensuring compliance with the regulation document, referred to as a compliance officer or department. The compliance officers are generally very familiar with the regulation document. However, when a new revision of the document is published or implemented, the compliance officers must learn what changed within the document.

Some documents may include a revision history chart, but generally this chart only identifies the major changes made to the document, thereby excluding the minor changes from the chart. Additionally, the revision chart usually provides a very small description of what changed, so it may be difficult to understand the effect of the change from the revision chart. Thus, the compliance officer generally has to read through each section to determine what change was made and the effect of the change on the entity, which is very difficult and time consuming. Thus, it may take a long time before the compliance department can determine what changes the entity needs to effectuate to ensure compliance with the new rules and regulations.

Some techniques have been introduced to determine the differences between different revisions or versions of the same document. For example, some word processing applications allow a user to compare two documents. The application then identifies what content has been added, deleted, or moved. However, this system merely compares the revisions of the document and identifies a change between the revisions and then provides an indication of that change. These identified changes may include changes that are not important, for example, formatting changes. Additionally, if sections have been moved within the document, the application does not accurately identify these moved sections if the sections are moved to a location beyond a predetermined distance from the original location of the section. Additionally, the application does not identify the substance of the change. For example, the application does not provide a description of the change that would allow a compliance officer to determine how the change affects the corresponding rule. In other words, the application may identify that a word or phrase has been added, deleted, or moved, but does not identify how that change affects the corresponding rule.

Some traditional techniques provide a method that partially summarizes the changes within the documents. For example, some techniques allow for creation of a revision history table with respect to source code files. As the source code is changed and a revision is committed, the system compares the source code file versions and determines what changes were made between the files. The system can then generate a revision history chart or header that identifies the changes between the two versions. However, this system works by identifying the changes and then listing the changes in the revision history chart. Such a system still does not provide a summary of how the change or revision affects the corresponding text or the entire document. Other systems in different applications work similarly. These systems are extractive summarizers and work with multiple restrictive assumptions. In other words, no traditional system generates a summary of the revision that would allow a user to read the summary and determine how the change affects the corresponding rule.

Accordingly, the techniques and systems as described herein provide a system and technique for identifying changes between revisions or versions of a document and providing a summary of the changes. The provided summary describes not only the change, but also how the change affects the corresponding rule or surrounding text. The system obtains at least two versions or revision of a document, for example, an original version and a revised version. The system extracts text from the documents to identify the structure of each of the documents. Once the structure has been identified, the system can align the sections of the documents. In other words, the system identifies a section from one revision that corresponds to a section from the other revision.

The system compares the aligned sections to identify differences between the revisions. Once the differences are identified the system generates a summary for the difference. The summary provides an indication of how the change affects the corresponding rule or regulation. In other words, the summary indicates how the change affected the surrounding text, thereby providing an indication of what effect the change has on the corresponding rule or regulation. To generate the summary, the system assigns a semantic label to the identified difference. The semantic label describes the semantic role of the changed word or phrase within the surrounding text. From the semantic label the system can generate a natural language summary using one or more summarization techniques.

Such a system provides a technical improvement over current systems that identify changes between documents. The systems and methods as described herein provide a system that not only identifies a change, including additions, deletions, and substitutions, but also provides a summary of the change and how the change affects the corresponding rule or surrounding text. Rather than requiring a compliance officer or other user to identify every change and then make a determination regarding the effect of the change, the system makes the identification and determines how the change affects the corresponding rule. Thus, the system and method as described herein provides a technique that allows a user to simply read the summary of the change to determine if the change requires a change in the operating procedures of the entity in order to ensure compliance with the changed rule. This reduces the amount of time that a compliance officer has to spend identifying the changes, thereby greatly reducing the amount of time that is required for implementing new rules and regulations required by the governing body.

FIG. 1 illustrates a method for identifying differences in revisions or versions of a document and providing a summary of the change that indicates an effect of the change on the surrounding text. At 101 the system may obtain at least two documents, each document being a different revision or version of the same document. One version of the document will be referred to herein as the original document and a subsequent version of the document will be referred to herein as the revision or new version of the document. However, it should be understood that the original document does not necessarily mean the very first version of a document. Rather, the original document merely indicates that it is version of the document that is earlier than the revision or new version of the document.

The example that will be used throughout is the example of a regulatory document. However, it should be understood by one skilled in the art that the systems and methods as described herein can be applied to any document that has revisions or versions. The regulatory document may include different rules and regulations that must be followed by a particular sector or industry. The regulatory document may be a document created and enforced by a governmental agency, for example, a financial regulations document, a legal document, a power generation regulations document, and the like. Alternatively, the regulatory document may be a document created and enforced by a group or other governing body, for example, a neighborhood association document, a corporate document, and the like. The entity creating and enforcing the document will be referred to as the governing body. An entity or sector that must follow the regulatory document will be referred to as the governed body.

To obtain the documents a user may upload the documents to the system or a data storage location accessible by the system. Alternatively, a user may provide a link or other marker to a location of the documents. For example, if a governing body has provided a rules and regulations document that is accessible on the Internet, the user may provide a URL (uniform resource location) link or other marker to the website or other Internet location. The system may also proactively obtain the documents. For example, if a link has been previously provided, the system may periodically access the link to determine if a new revision of the document has been provided at the link. Obtaining the documents may be performed using a variety of known techniques.

At 102 the system identifies a structure of each of the two documents. To identify the structure of the documents, the system extracts content from each of the documents. For example, the system may parse the documents and extract text from each of the documents. It should be noted that each revision of the document does not have to be in the same file format. For example, the original version may be in a word processing document file format and the revision may be in an Internet language file format. In extracting content from each document, the system may convert the documents to a particular file format, for example, a file format that allows for text recognition. However, a file conversion is not required. Additionally, to extract content from the document, the system may use a text recognition technique, for example, optical character recognition (OCR), natural language processing, or the like.

Extracting content from the documents allows the system to identify the format of the system by providing an indication of dependency between different clauses of the document. For example, the system may identify if the extracted content is part of a sentence, paragraph, page, section, or the like. The system may also identify the temporal relationship between different extracted content, for example, one extracted clause occurs before another extracted clause. Accordingly, the system may add hierarchy information to each of the documents identifying the structure of the document. Adding hierarchy information may include placing each piece of extracted content into a hierarchical structure, for example, a tree structure. Alternatively, adding hierarchy information may include adding tags or other invisible markers to each document that identifies the hierarchical location of the content within the document.

At 103 the system may align sections of the documents. This alignment may include matching the sections of the documents that correspond to each other. In other words, the system may identify one section (e.g., sentence, clause, paragraph, section, page, etc.) from the original version and may identify the section of the revision that corresponds to the section of the original version. Performing the alignment may include comparing words between the documents in order to determine which sections may correspond to each other. For example, if a section in the original version matches 90% of a section in the revision document, the system may determine that the sections correspond to each other. It should be understood that 90% is merely an example and different thresholds for determining a match may be utilized. Additionally, the thresholds for determining a match may be different for different sections within the document.

In performing the alignment, the system may use information from the identified structure of the document. For example, the system may compare the identified structures from the documents to each other to identify the location of a particular section within the documents. Using the identified structure of the document, either alone or in combination with the word matching, allows the system to identify corresponding sections within the documents even if the sections have been moved between revisions. For example, if the section from the original document has been moved to a location three pages later in the revision, the system can identify that these sections still correspond to each other. Alignment may be performed at any level of granularity, for example, clause-by-clause, paragraph-by-paragraph, page-by-page, or the like.

Once the document sections have been aligned, the system may identify at least one difference between the two documents at 104. A difference may be identified if a character, word, or phrase has been added, deleted, substituted, or repositioned. For ease of readability, the term "word" will be used here throughout to refer to the changed object. However, it should be understood that the changed object does not have to be an entire word or only a single word. In other words, the changed object may include a single character or group of characters smaller than a word, a phrase, a sentence, a paragraph, a table, an image, or the like.

Added words include words that were not included in the original document but that are included in the revision. Deleted words include words that were included in the original document but that are not included in the revision. Substituted words include those words that have changed from the original document to the revision, but that retain the same inherent meaning as used in the original document. An example substituted word includes an expansion of an acronym (e.g., in the original document the acronym was used, but in the revision the expanded form of the acronym is used). Another example of a substituted word includes a named entity change (e.g., the entity had one name in the original document and now has a different name in the revision). Repositioned words include those words that were included in the original document and are also included in the revision but are located in a different hierarchical location in the revision than in the original document.

Identifying the differences may be performed using one or more difference identification techniques. For example, the system may employ traditional difference identification techniques that detect additions, deletions, and repositions within the document. Identifying substitutions includes incorporating elements of assigning semantic labels and providing a summary of the changes. In other words, to identify substitutions the system determines the role of the word within the surrounding text to determine the effect of the change on the underlying rule. From this determination, the system can determine if the change is a mere substitution. The system may also access secondary sources to identify the differences. For example, the system may access an ontology that includes the field of the regulation. The ontology may assist in identifying the differences, for example, assisting in identifying substitutions.

The system may also perform phrase completion on the changed words. Phrase completion may include identifying the phrase that contains the changed word and extracting the one or more words included in the identified phrase. To identify the phrase the system may use any natural language parsing technique, for example, a dependency parsing technique, or the like. For example, the system may determine the words or phrases within the document that the changed word is dependent upon, for example, a verb may be dependent upon a noun, a sentence may be dependent on a paragraph, or the like. In determining the dependency the system may identify a relationship between the changed word and one or more other words within the document. An example algorithm for identifying differences between the documents is shown at 200 of FIG. 2.

If a difference has not been identified at 104, the system may take no further action at 105. Additionally, the system may take no further action if the system identifies a difference but the difference has no effect on any underlying rules or regulations. For example, if the system identifies that only the format of the documents has been changed, the system may determine that this change does not affect any underlying rules or regulations and may, therefore, take no further action at 105. Alternatively, the system may notify a user that no differences have been found between the two revisions or that the differences identified have no effect on any underlying rules or regulations.

However, if a difference is identified at 104, the system may generate a summary that describes the difference. Accordingly, the system may assign a semantic label to the identified difference at 106. To assign a semantic label, the system may access or use one or more semantic role dictionaries, ontologies, information extractors, or the like. The semantic label describes a semantic role of the word within the text surrounding the difference. In other words, the semantic label describes the semantic role of the word within the completed phrase. The semantic label provides an indication of the category or aspect of the changed word. In other words, the system uses the surrounding text to determine the semantic relationship of the identified change with respect to the surrounding text or completed phrase. This semantic relationship is then used to identify the aspect of the rule or regulation that has changed, thereby allowing the system to assign a semantic label indicating the semantic role of the changed word to the identified difference. Assignment of the semantic label may include using a parse tree to identify the semantic parts of the phrase or text surrounding the identified difference. Once the parse tree has been created, the system can identify each semantic part of the phrase, thereby identifying the semantic role of the changed word. The system can then assign a label that corresponds to the semantic role to the changed word.

FIG. 3A and FIG. 3B illustrate example difference identification and summary output generation. 301A and 301B correspond to the clause extracted from the original document. 302A and 302B correspond to the corresponding clause of the revision document. The identified change or difference between the two versions is illustrated in light gray at 303A, 303B, and 303C. The system then applies a semantic label 304A and 304B to the role of the changed word within the document. For example, in FIG. 3A, the deadline for when the reporting is due has changed. Therefore, the system assigns the semantic label of "Deadline" 304A to the difference. As another example, in FIG. 3B, the condition for the definition of "Cash Value" has changed. Therefore, the system assigns the semantic label of "condition" 304B to the difference.

At 107 the system provides a summary of the identified differences by generating a summary using the assigned semantic label and the surrounding text of the identified difference. To generate the summary the system compresses the text surrounding the identified difference corresponding to the identified label to generate, using a natural language generation technique, a natural language summary of the identified difference. For example, referring to FIG. 3A and FIG. 3B example summaries are illustrated at 305A and 305B. In FIG. 3A, the example summary includes two possible summaries that may be provided. To generate the summary the system may use a variety of summary generation techniques.

One technique for generating the summary is a template based summarization technique. Within this technique each semantic role or semantic label has a corresponding template or assigned template. The template provides an indication of how to generate a natural language sentence or summarization when a word having a particular semantic role has been changed within the phrase. The template identifies which words or word role (e.g., noun, verb, etc.) within the surrounding text should be extracted or identified to complete the natural language sentence. Thus, once the semantic role or label has been assigned, the system identifies the corresponding template. Once the template has been selected, the system uses the template to generate one or more candidate sentences. In the case that more than one candidate sentence is generated (e.g., as shown in FIG. 3A), the system ranks the sentences and then provides the top ranking sentence as the summary. Ranking the candidate sentences can be performed using a variety of techniques.

Another technique for generating the summary is a focused abstractive summarization. The focused abstractive summarization technique is a deep learning technique. Using this technique the system extracts information from the document, for example, using an information extractor, or the like. The extracted information corresponds to the underlying rule or regulation and includes the semantic labels. The system then summarizes the extracted information using one or more document summarization techniques to generate one or more candidate summary sentences. The system can then rank and select the sentence to be used for the summary provision.

It should be understood that the discussed techniques for summary generation are merely examples and other techniques for summary generation are possible and contemplated. Additionally, the summary may be generated for different levels of granularity. In other words, rather than providing a summary for a single word or sentence, the summary may encompass changes to an entire paragraph, page, section, or the like. The level of granularity may be different for each change. For example, if one change affects an entire paragraph, the summary granularity may be for that entire paragraph, whereas, if the change affects only a sentence, the summary granularity may be for only that sentences.

Once the summary has been generated the system provides the summary to a user or other entity. The generated summary is provided in a natural language manner, similar to how a person would provide a summary. Thus, from the generated summaries, not only can the user identify what changes were made, but the user can also identify what effect that the change has with respect to the underlying rule or regulation.

Figure 4:
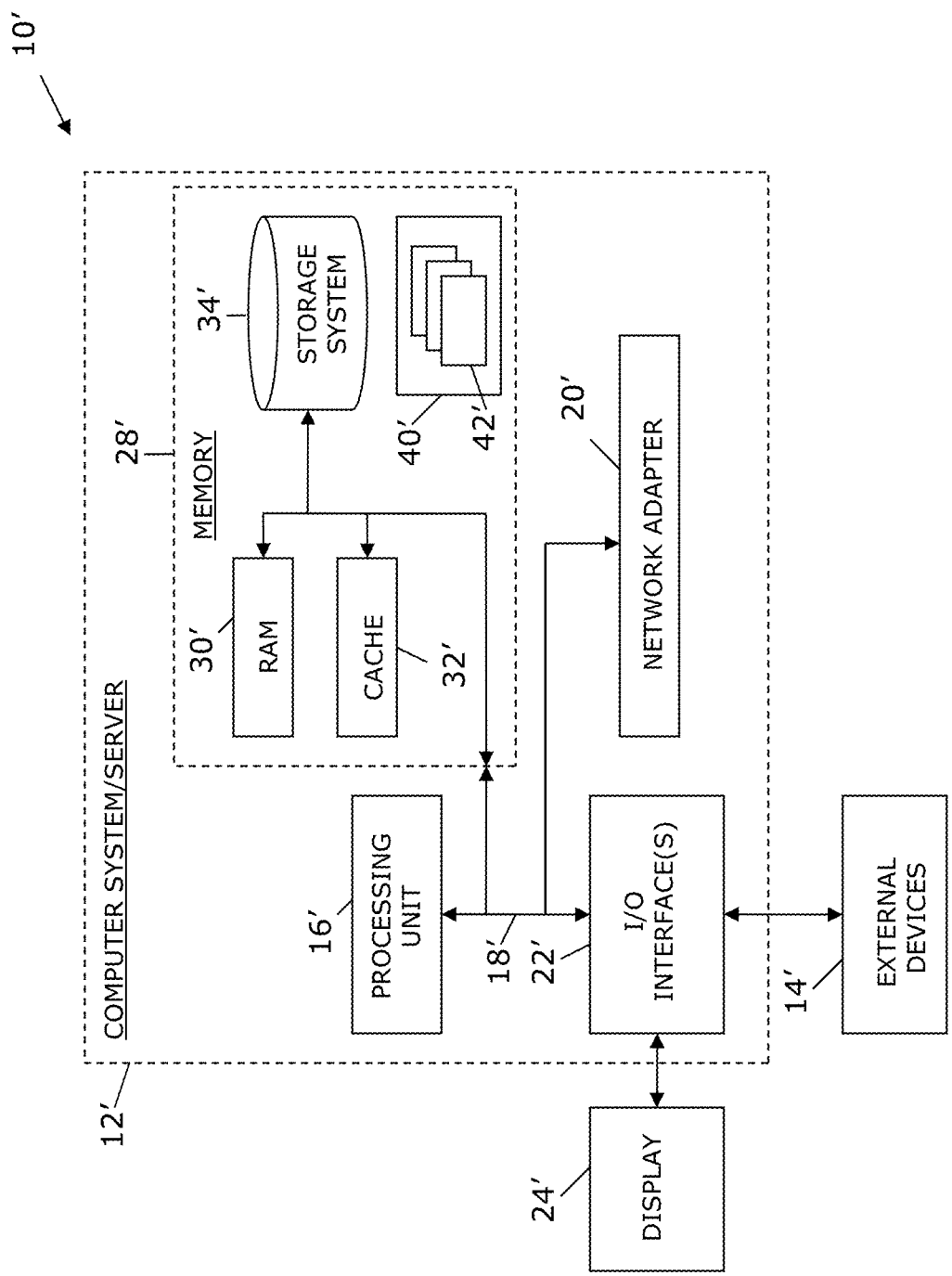
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
obtaining at least two documents, wherein one of the at least two documents comprises a different revision of another of the at least two documents;
identifying a structure of each of the at least two documents by parsing each of the at least two documents to extract text from each of the at least two documents;
aligning, based upon the identified structure, sections of the at least two documents, wherein the aligning comprises matching a section from one of the at least two documents and a corresponding section from another of the at least two documents;
identifying at least one difference between the at least two documents by comparing the aligned sections of the at least two documents, the aligned sections each having text surrounding the at least one difference;
assigning a semantic label to the identified at least one difference, wherein the semantic label is an assigned word which indicates a semantic role of a changed word from the identified at least one difference within the text surrounding the identified at least one difference, wherein the semantic label is generated using a parse tree to identify semantic parts of the text surrounding the identified at least one difference and the semantic role of the at least one difference, wherein the semantic role is identified by determining a semantic relationship of the identified at least one difference with respect to the text surrounding the identified at least one difference; and
providing and displaying a natural language summary of the identified at least one difference, which comprises a compression of the text surrounding the identified at least one difference, wherein the summary is generated utilizing a summarization technique that incorporates the semantic label assigned to the identified at least one difference to be included with the compressed text in the natural language summary, the natural language summary identifying a context of the at least one difference between one of the at least two document and the revision of the one of the at least two documents.

2. The method of claim 1, wherein the identifying the structure of the document comprises adding hierarchy information to each of the at least two documents.

3. The method of claim 1, wherein the identifying at least one difference comprises identifying the phrase that contains the at least one difference by extracting one or more words surrounding the identified at least one difference.

4. The method of claim 3, wherein the identifying the phrase comprises using a natural language parsing technique.

5. The method of claim 1, wherein the at least one difference is selected from the group consisting of: an addition, a deletion, a substitution, and a reposition.

6. The method of claim 1, wherein the providing a summary comprises using a natural language generation technique.

7. The method of claim 1, wherein the providing a summary comprises using a template based summarization technique.

8. The method of claim 7, wherein the template based summarization technique comprises (i) identifying a template corresponding to the assigned semantic label and (ii) generating, from the identified template, a sentence summarizing the at least one identified change.

9. The method of claim 8, wherein the generating a sentence comprises (i) generating a plurality of sentences, (ii) ranking the plurality of generated sentences, and (iii) selecting the highest ranked sentence.

10. The method of claim 1, wherein the providing a summary comprises using a focused abstractive summarization technique that (i) extracts information from the document, (ii) summarizes the extracted information, and (iii) generates a summary from the summarized extracted information corresponding to the at least one identified difference.

11. An apparatus, comprising:
at least one processor; and
a computer readable storage medium having computer readable program code embodied therewith and executable by the at least one processor, the computer readable program code comprising:
computer readable program code configured to obtain at least two documents, wherein one of the at least two documents comprises a different revision of another of the at least two documents;
computer readable program code configured to identify a structure of each of the at least two documents by parsing each of the at least two documents to extract text from each of the at least two documents;
computer readable program code configured to align, based upon the identified structure, sections of the at least two documents, wherein the aligning comprises matching a section from one of the at least two documents and a corresponding section from another of the at least two documents, the aligned sections each having text surrounding the at least one difference;
computer readable program code configured to identify at least one difference between the at least two documents by comparing the aligned sections of the at least two documents;
computer readable program code configured to assign a semantic label to the identified at least one difference, wherein the semantic label is an assigned word which indicates a semantic role of a changed word from the identified at least one difference within the text surrounding the identified at least one difference, wherein the semantic label is generated using a parse tree to identify semantic parts of the text surrounding the identified at least one difference and the semantic role of the at least one difference, wherein the semantic role is identified by determining a semantic relationship of the identified at least one difference with respect to the text surrounding the identified at least one difference; and computer readable program code configured to provide and display a natural language summary of the identified at least one difference, which comprises a compression of the text surrounding the identified at least one difference, wherein the summary is generated utilizing a summarization technique that incorporates the semantic label assigned to the identified at least one difference to be included with the compressed text in the natural language summary, the natural language summary identifying a context of the at least one difference between one of the at least two document and the revision of the one of the at least two documents.

12. A computer program product, comprising:

a computer readable storage medium having computer readable program code embodied therewith, the computer readable program code executable by a processor and comprising:

computer readable program code configured to obtain at least two documents, wherein one of the at least two documents comprises a different revision of another of the at least two documents;

computer readable program code configured to identify a structure of each of the at least two documents by parsing each of the at least two documents to extract text from each of the at least two documents;

computer readable program code configured to align, based upon the identified structure, sections of the at least two documents, wherein the aligning comprises matching a section from one of the at least two documents and a corresponding section from another of the at least two documents;

computer readable program code configured to identify at least one difference between the at least two documents by comparing the aligned sections of the at least two documents, the aligned sections each having text surrounding the at least one difference;

computer readable program code configured to assign a semantic label to the identified at least one difference, wherein the semantic label is an assigned word which indicates a semantic role of a changed word from the identified at least one difference within the text surrounding the identified at least one difference, wherein the semantic label is generated using a parse tree to identify semantic parts of the text surrounding the identified at least one difference and the semantic role of the at least one difference, wherein the semantic role is identified by determining a semantic relationship of the identified at least one difference with respect to the text surrounding the identified at least one difference; and computer readable program code configured to provide and display a natural language summary of the identified at least one difference, which comprises a compression of the text surrounding the identified at least one difference, wherein the summary is generated utilizing a summarization technique that incorporates the semantic label assigned to the identified at least one difference to be included with the compressed text in the natural language summary, the natural language summary identifying a context of the at least one difference between one of the at least two document and the revision of the one of the at least two documents.

13. The computer program product of claim 12, wherein the identifying the structure of the document comprises adding hierarchy information to each of the at least two documents.

14. The computer program product of claim 12, wherein the identifying at least one difference comprises identifying the phrase that contains the at least one difference by extracting one or more words surrounding the identified at least one difference.

15. The computer program product of claim 14, wherein the identifying the phrase comprises using a natural language parsing technique.

16. The computer program product of claim 12, wherein the providing a summary comprises using a template based summarization technique.

17. The computer program product of claim 16, wherein the template based summarization technique comprises (i) identifying a template corresponding to the assigned semantic label and (ii) generating, from the identified template, a sentence summarizing the at least one identified change.

18. The computer program product of claim 17, wherein the generating a sentence comprises (i) generating at plurality of sentences, (ii) ranking the plurality of generated sentences, and (iii) selecting the highest ranking sentence.

19. The computer program product of claim 12, wherein the providing a summary comprises using a focused abstractive summarization technique that (i) extracts information from the document, (ii) summarizes the extracted information, and (iii) generates a summary from the summarized extracted information corresponding to the at least one identified difference.

20. A method, comprising:

obtaining two documents, wherein each of the two documents comprises a different version of the same document;

aligning sections of the at least two documents, wherein the aligning comprises parsing each of the two documents to extract text from each of the two documents;

identifying word changes between the two documents by (i) matching sections from one of the two documents to the other of the two document utilizing the extracted text and (ii) comparing each pairing of sections that are matched to the other from the matched sections for a changed word, and wherein each of the paired sections has text surrounding a changed word;

assigning a semantic label to each of the identified word changes, wherein the semantic label is an assigned word which identifies a semantic role of a changed word within the text from one of the paired sections that surrounds the changed word, wherein the semantic label is generated using a parse tree to identify semantic parts of the document surrounding the identified word changes and the semantic role of the word changes, wherein the semantic role is identified by determining a semantic relationship of the changed word with respect to the surrounding sentence structure of the document;

generating, using the assigned semantic labels, a natural language summary for each of the identified word changes that summarizes what has changed between the different versions of the same document, wherein the generating comprises compressing the sentence structure of the document surrounding the identified word changes, utilizing a summarization technique that incorporates the semantic label assigned to the identified word changes into the natural language summary, wherein the natural language summary identifies a context of the word changes between one of the two documents and the different version of the same document with the compressed sentence structure of the document; and providing and displaying the generated natural language summaries for each of the identified word changes.

* * * * *